(12) United States Patent
Zhang

(10) Patent No.: US 12,029,302 B2
(45) Date of Patent: Jul. 9, 2024

(54) COSMETIC POWDER BOX

(71) Applicant: Derik Industrial Co., Ltd., Guangdong (CN)

(72) Inventor: Shaoxiang Zhang, Guangdong (CN)

(73) Assignee: Derik Industrial Co., Ltd., Guangdong (CN)

( * ) Notice: Subject to any disclaimer, the term of this patent is extended or adjusted under 35 U.S.C. 154(b) by 0 days.

(21) Appl. No.: 18/368,639

(22) Filed: Sep. 15, 2023

(65) Prior Publication Data

US 2024/0090645 A1   Mar. 21, 2024

(30) Foreign Application Priority Data

Sep. 15, 2022   (CN) .......................... 202222452106.8

(51) Int. Cl.
    *A45D 33/00*     (2006.01)
    *A45D 33/22*     (2006.01)
    *A45D 33/24*     (2006.01)

(52) U.S. Cl.
    CPC .......... *A45D 33/008* (2013.01); *A45D 33/22* (2013.01); *A45D 33/24* (2013.01)

(58) Field of Classification Search
    CPC ........ A45D 33/24; A45D 33/22; A45D 33/18; A45D 33/006; A45D 33/008; A45D 33/003; A45C 5/005; A45C 5/003; A45C 11/008
    USPC ........................................ 206/581, 823, 235
    See application file for complete search history.

(56) References Cited

U.S. PATENT DOCUMENTS

| | | | | |
|---|---|---|---|---|
| 1,489,788 | A * | 4/1924 | Reid ...................... | A45D 33/22 132/296 |
| 1,528,645 | A * | 3/1925 | Ralph .................. | A45D 33/006 132/301 |
| 1,555,118 | A * | 9/1925 | Hiering ................ | A45D 33/006 132/303 |
| 1,735,483 | A * | 11/1929 | Wacker ................ | A45D 33/006 132/305 |
| 1,748,727 | A * | 2/1930 | Poranski .............. | A45D 33/006 132/305 |
| 1,773,624 | A * | 8/1930 | Kendall ............... | A45D 33/006 132/300 |

(Continued)

FOREIGN PATENT DOCUMENTS

| | | |
|---|---|---|
| CN | 202536461 U | 11/2012 |
| FR | 3131510 A1 * | 1/2022 |

OTHER PUBLICATIONS

Stéphane Leroux, "FR3131510A1 translated" (Year: 2022).*

*Primary Examiner* — Jacqueline T Johanas
*Assistant Examiner* — Holly T. To
(74) *Attorney, Agent, or Firm* — Cooper Legal Group, LLC

(57) ABSTRACT

A cosmetic powder box, belonging to cosmetic powder box, includes a bottom box; a box base, one side of the box base is rotationally connected to the bottom box, and the box base is sleeved in the bottom box through rotating around the bottom box; a box cover, one side of the box cover is rotationally connected to the box base; when the box base is sleeved in the bottom box, the box cover rotates around the bottom box, such that the box cover is buckled with the bottom box, and a mounting hole is defined in a center of the box cover; a mounting component detachably fastened in the mounting hole; wherein the bottom box, the box base and the box cover are of an integrated structure.

16 Claims, 12 Drawing Sheets

(56) References Cited

U.S. PATENT DOCUMENTS

| | | | | |
|---|---|---|---|---|
| 2,035,831 | A * | 3/1936 | Parkin | A45D 33/006 292/87 |
| 2,158,548 | A * | 5/1939 | Lemire | A45D 33/006 292/DIG. 16 |
| 2,247,526 | A * | 7/1941 | Steinen | A45D 42/08 359/882 |
| 2,267,132 | A * | 12/1941 | Pavenick | A45D 42/10 362/144 |
| 2,421,646 | A * | 6/1947 | Pepin | A45D 33/18 220/376 |
| 3,001,748 | A * | 9/1961 | Thomas | A45C 15/04 248/300 |
| 3,031,930 | A * | 5/1962 | Kafig | A61B 1/247 248/467 |
| 3,256,892 | A * | 6/1966 | Esposito, Jr. | A45C 11/32 206/229 |
| 4,365,711 | A * | 12/1982 | Long | G11B 23/0233 206/387.13 |
| 4,500,169 | A * | 2/1985 | Donnelly | A45D 42/00 434/371 |
| 4,863,054 | A * | 9/1989 | Capetta | B65D 43/162 220/4.23 |
| 4,866,579 | A * | 9/1989 | Miller | B60J 3/0282 24/615 |
| 4,901,884 | A * | 2/1990 | Kallenbach | B65D 43/162 220/4.23 |
| 4,951,406 | A * | 8/1990 | Lemire | G09F 13/14 40/576 |
| 5,016,777 | A * | 5/1991 | Marvin | B65D 43/162 220/839 |
| 5,135,012 | A * | 8/1992 | Kamen | A45C 13/02 206/823 |
| 5,269,430 | A * | 12/1993 | Schlaupitz | B65D 43/162 220/4.23 |
| 5,515,993 | A * | 5/1996 | McManus | B65D 43/162 206/508 |
| 5,667,094 | A * | 9/1997 | Rapchak | B65D 43/162 220/834 |
| 5,704,378 | A * | 1/1998 | Machelett | A45C 13/005 206/823 |
| 5,842,486 | A * | 12/1998 | Davis | A45D 40/22 132/301 |
| 5,855,766 | A * | 1/1999 | Mamiye | B65D 43/168 190/122 |
| 5,908,037 | A * | 6/1999 | Pierson | A45C 13/008 132/304 |
| 5,950,640 | A * | 9/1999 | Duncan | A45D 33/008 132/316 |
| 6,012,789 | A * | 1/2000 | Lai | A45C 15/04 40/724 |
| 6,055,992 | A * | 5/2000 | Skarne | A45C 11/00 132/294 |
| 6,223,754 | B1 * | 5/2001 | Burdi | A45D 33/006 206/823 |
| 6,502,587 | B1 * | 1/2003 | Kellum | A45D 26/0066 132/288 |
| 6,554,147 | B1 * | 4/2003 | Maida, Jr. | B65D 43/162 220/4.23 |
| 9,131,761 | B2 * | 9/2015 | Kalyanpur | A45D 40/22 |
| 9,187,209 | B1 * | 11/2015 | Hanna | B65D 43/0254 |
| 9,220,332 | B1 * | 12/2015 | DeVito | A45D 33/22 |
| 9,776,773 | B1 * | 10/2017 | Chen | B65D 25/105 |
| 11,006,731 | B2 * | 5/2021 | Dunton | A45D 33/006 |
| 2002/0074387 | A1 * | 6/2002 | Stewart | B65D 5/706 229/125.05 |
| 2002/0157684 | A1 * | 10/2002 | Sebban | A45D 40/221 132/301 |
| 2005/0189367 | A1 * | 9/2005 | Chasid | B65D 83/0805 221/63 |
| 2005/0279753 | A1 * | 12/2005 | Timm | A45D 40/222 220/523 |
| 2011/0048443 | A1 * | 3/2011 | Pires | A45D 33/003 132/200 |
| 2011/0073610 | A1 * | 3/2011 | Giraud | B65D 43/162 220/833 |
| 2012/0279969 | A1 * | 11/2012 | Antal, Sr. | B65D 43/161 220/831 |
| 2014/0026921 | A1 * | 1/2014 | Zhang | A45D 33/008 132/316 |
| 2015/0307239 | A1 * | 10/2015 | Chen | B65D 43/162 220/270 |
| 2017/0006995 | A1 * | 1/2017 | Lin | A45D 33/003 |
| 2017/0007004 | A1 * | 1/2017 | Burditt, Jr. | A45D 33/008 |
| 2017/0096265 | A1 * | 4/2017 | Kieffer | B65D 43/163 |
| 2017/0305616 | A1 * | 10/2017 | Barbier | B65D 43/162 |
| 2018/0177277 | A1 * | 6/2018 | Dinata | B65D 41/04 |
| 2018/0339815 | A1 * | 11/2018 | Mooney | B65D 83/0894 |
| 2019/0000210 | A1 * | 1/2019 | Kim | B65D 77/04 |
| 2019/0003699 | A1 * | 1/2019 | Mondora | A45D 42/10 |
| 2019/0029392 | A1 * | 1/2019 | Carraro | A45D 33/008 |
| 2019/0029400 | A1 * | 1/2019 | Carraro | A45D 33/008 |
| 2019/0365074 | A1 * | 12/2019 | Kikuchi | A45D 33/006 |
| 2019/0374004 | A1 * | 12/2019 | Martins | A45D 33/24 |
| 2020/0095009 | A1 * | 3/2020 | Allers | B65D 21/0233 |
| 2020/0146420 | A1 * | 5/2020 | Kim | A45D 33/008 |
| 2020/0198849 | A1 * | 6/2020 | Chen | B65D 85/24 |
| 2021/0059384 | A1 * | 3/2021 | Shin | A45D 40/22 |
| 2021/0130060 | A1 * | 5/2021 | Goad | B65D 75/24 |
| 2021/0169198 | A1 * | 6/2021 | Moretti | A45D 40/24 |
| 2022/0000238 | A1 * | 1/2022 | Martin | A45D 34/00 |
| 2022/0175111 | A1 * | 6/2022 | Reid | A45D 40/24 |
| 2022/0219866 | A1 * | 7/2022 | Yang | B65D 1/36 |
| 2022/0346522 | A1 * | 11/2022 | Cheng | A45D 33/24 |
| 2023/0025060 | A1 * | 1/2023 | Gasbarro | B65D 43/161 |
| 2023/0095112 | A1 * | 3/2023 | Seguin | A45D 33/003 |
| 2023/0095209 | A1 * | 3/2023 | Seguin | A45D 33/22 132/293 |
| 2023/0097231 | A1 * | 3/2023 | Seguin | A45D 40/22 132/286 |
| 2023/0147837 | A1 * | 5/2023 | Ezzina | A45D 33/003 220/23.87 |
| 2024/0122331 | A1 * | 4/2024 | Lee | A45D 40/22 |

* cited by examiner

A

B

COSMETIC POWDER BOX

CROSS-REFERENCE TO RELATED APPLICATION

The present application is based on and claims the priority benefits of China application No. 202222452106.8, filed on Sep. 15, 2022. The entirety of China application No. 202222452106.8 is hereby incorporated by reference herein and made a part of this specification.

TECHNICAL FIELD

The present application relates to the technical field of cosmetic powder box, and, particularly to a cosmetic powder box.

BACKGROUND ART

China utility model patent application with a publication no. CN202536461U discloses an integrated cosmetics powder box, including a box bottom, a box base and a box cover, and a first folding section extends from the box bottom and is connected to the box base. The box base is sleeved in the box bottom by fold of the first folding section and is formed a whole one with the box bottom. A second folding section connected to the box cover extends from a side of the box base opposite to the first folding section, and the box cover is buckled with the box bottom by fold of the second folding section. After the box cover is buckled with the box bottom, the second folding section and the first folding section are both folded in the cosmetic powder box. The box cover, the second folding section, the box base, the first folding section and the box bottom are of an integrated structure. A mirror groove is formed in the center of the box cover, the shape of the mirror groove is in conjunction with the shape of the box cover. A plane mirror is fixedly provided in the mirror groove, and the shape of the plane mirror is matched with the shape of the mirror groove. The mirror in the cosmetic powder box is difficult to disassemble, which is inconvenient to recycle the cosmetic box after the powder material in the cosmetic powder box is used up.

SUMMARY

In order to facilitate recycling a cosmetic powder box, a cosmetic powder box is disclosed.

The above invention objective of the present application is realized via the following cosmetic powder box, including:
- a bottom box;
- a box base, one side of the box base is rotationally connected to the bottom box, and the box base is sleeved in the bottom box through rotating around the bottom box;
- a box cover, one side of the box cover is rotationally connected to the box base; when the box base is sleeved in the bottom box, the box cover rotates around the bottom box, such that the box cover is buckled with the bottom box, and a mounting hole is defined in a center of the box cover;
- a mounting component detachably fastened in the mounting hole;
- the bottom box, the box base and the box cover are of an integrated structure.

The mounting component is provided, and the mounting component is detachably fastened in the mounting hole in the center of the box cover, such that the part in the center of the box cover can be disassembled. The bottom box, the box base and the box cover are of an integrated structure, such that the bottom box, the box base and the box cover can be separately recycled as single materials at the same time after the mounting component is disassembled.

It can be further configured in a preferable embodiment of the present application that a mounting slot for mounting a plane mirror is defined at the mounting component, an inner sidewall of the mounting hole is provided with a first snap block, a size of the mounting component is matched with a size of the mounting hole, and a first snapping groove configured to be engaged with the first snap block is defined at an outer sidewall of the mounting component.

The mounting slot for mounting a plane mirror is defined at the mounting component, thereby facilitating the user to mount the mirror to wear make-up. Since the first snap block is engaged with the first snapping groove, the mounting component with mirror can be detachably fastened in the mounting hole in the center of the box cover. When the cosmetic powder box must be disassembled after the cosmetic powder is used up, a force can be applied on the mounting component to detach the first snap block from the first snapping groove, such that the mounting component is detached from the mounting hole, so as to detach the powder box from the mounting component, thereby recycling single materials separately.

It can be further configured in a preferable embodiment of the present application that a mounting slot for mounting a plane mirror is defined at the mounting component; an inner sidewall of the mounting hole is provided with a magnetic sheet along a circumference of the mounting hole; a size of the mounting component is matched with a size of the mounting hole, and the mounting component is provided with a magnetic strip configured to attract the magnetic sheet.

The mounting slot for mounting a plane mirror is defined at the mounting component, thereby facilitating the user to mount the mirror to wear make-up. When the mounting component is located in the mounting hole, the mounting component with mirror can be detachably fastened in the mounting hole in the center of the box cover because of the attraction between the magnetic sheet and the magnetic strip. When the cosmetic powder box must be disassembled after the cosmetic powder is used up, a force can be applied on the mounting component to detach the magnetic strip from the attraction, so that the mounting component is detached from the mounting hole, so as to detach the powder box from the mounting component, thereby recycling single materials separately.

It can be further configured in a preferable embodiment of the present application that a mounting slot for mounting a plane mirror is defined at the mounting component, an outer sidewall of the mounting component is provided with an external thread; an inner sidewall of the mounting hole is obliquely provided with a plurality of flanges at positions corresponding to a thread path of the external thread, and the external thread is screwed to the plurality of flanges.

The mounting slot for mounting a plane mirror is defined at the mounting component, thereby facilitating the user to mount the mirror to wear make-up. The mounting component with mirror can be detachably fastened in the mounting hole because of the threaded connection between the plurality of flanges of the mounting component and the external thread of the mounting hole. When the cosmetic powder box must be disassembled after the cosmetic powder is used up, the mounting component can be rotated to detach from the mounting hole, so that the powder box is detached from the mounting component, thereby recycling single materials separately.

It can be further configured in a preferable embodiment of the present application that the mounting component is a mounting ring, and a transparent decorative sheet is arranged in the mounting ring.

The transparent decorative sheet is provided, which facilitates the users to observe inside of the bottom box when the box cover is buckled with the bottom box.

It can be further configured in a preferable embodiment of the present application that a first folding section is integrally fixed between the bottom box and the box base, and the box base is rotationally connected to the bottom box by fold of the first folding section;
- a second folding section is integrally fixed between the box base and the box cover, and the box cover is rotationally connected to the box base by fold of the second folding section; and
- the first folding section and the second folding section are located at opposite sides of the box base, respectively.

The first folding section and the second folding section are provided, such that the box base can be rotationally connected to the bottom box via the first folding section and the box cover can be rotationally connected to the box base. The first folding section and the second folding section are located at opposite sides of the box base, respectively, such that centers of the bottom box, the box base and the box cover are located on the same straight line when they are unfolded, thereby improving an impression of the powder box.

It can be further configured in a preferable embodiment of the present application that a first groove is provided at a side of the bottom box, the first folding section is secured to an inner bottom wall of the first groove; a side of the box cover opposite to the second folding section is provided with a cover plate for covering the first folding section; a second snapping groove is defined at a side of the cover plate facing the box cover, and the second snapping groove is configured to be engaged with the first folding section after being folded.

By adopting the above technical solution, after the box base is sleeved in the bottom box via the first folding section, the box cover drives the cover plate to position in the first groove through the rotation of the second folding section. Further, the second snapping groove is engaged with the first folding section after being folded, so that the rotation of the box cover can be limited, and the cover plate can cover the first folding section, thereby improving the impression of the powder box.

It can be further configured in a preferable embodiment of the present application that a slot is defined at a section of the second folding section facing the box base, a second groove is defined at a side of the bottom box opposite to the first folding section, a size of the second groove is matched with a size of the second folding section after being folded, and an inner bottom wall of the second groove is configured with an inserting block for inserting in the slot.

By adopting the above technical solution, when the second folding section rotates into the second groove, the inserting block in the second groove is inserted into the slot of the second folding section, so that the inserting block in the second groove is inserted in the slot of the second folding section, thereby limiting the rotation of the second folding section, and further the box base is sleeved in the bottom box. Since the size of the second groove is matched with the size of the second folding section after being folded, the second folding section after being folded can be hidden in the second groove when the second folding section is located in the second groove and the box cover is inserted in the bottom box, thereby improving the impression of the powder box.

It can be further configured in a preferable embodiment of the present application that the bottom box is fixedly provided with a positioning ring, the box cover is fixedly provided with at least one arc-shaped block; and when the bottom box is covered with the box cover, an inner sidewall of the arc-shaped block abuts against an outer sidewall of the positioning ring.

By adopting the above technical solution, when the bottom box is covered with the box cover, the inner sidewall of the box cover abuts against the outer sidewall of the positioning ring, so that the positioning ring has a positioning effect on the arc-shaped block, and in turn has a positioning effect on the box cover.

It can be further configured in a preferable embodiment of the present application that the inner sidewall of the arc-shaped block is fixedly provided with an arc-shaped protrusion, an arc-shaped groove is formed at the outer sidewall of the positioning ring; and when the bottom box is covered with the box cover, an outer sidewall of the arc-shaped protrusion abuts against an inner sidewall of the arc-shaped groove.

By adopting the above technical solution, when the bottom box is covered with the box cover, the outer sidewall of the arc-shaped protrusion abuts against the inner sidewall of the arc-shaped groove, such that the bottom box can be covered by the box cover more firmly.

It can be further configured in a preferable embodiment of the present application that the arc-shaped protrusion is provided with a first rounded corner.

On the one hand, the first rounded corner is provided to increase whole aesthetics of the arc-shaped protrusion; on the other hand, when opening and covering the box cover, the first rounded corner can increase a contacting area between the arc-shaped protrusion and the positioning ring, such that the pressure of the arc-shaped protrusion on the positioning ring can be reduced, therefore, the positioning ring can be protected.

It can be further configured in a preferable embodiment of the present application that a plurality of relief grooves are defined in the positioning ring, a groove bottom of each of the plurality of relief grooves is fixedly provided with a first clamping block, a container box for powder material is provided between the plurality of first clamping blocks; the inner sidewall of the arc-shaped block is fixedly provided with a plurality of second clamping blocks corresponding to the plurality of first clamping blocks one by one; and when the bottom box is covered with the box cover, an outer sidewall of each of the plurality of first clamping blocks abuts against an inner sidewall of a respective one of the plurality of second clamping blocks.

The first clamping blocks at the bottom box have the same quantity as the second clamping blocks at the box cover, and when the bottom box is covered with the box cover, the outer sidewall of the first clamping block abuts against the inner sidewall of the second clamping block, therefore, the second clamping block squeezes the first clamping block, so that the plurality of first clamping blocks are deformed in a direction towards the container box, and the plurality of first clamping blocks clamp the container box, such that the container box can be mounted on the bottom box more firmly.

It can be further configured in a preferable embodiment of the present application that the plurality of relief grooves are evenly distributed.

By adopting the above technical solution, the whole aesthetics of the positioning ring is increased. The first clamping block is provided in each of the relief grooves, so that the plurality of first clamping blocks are evenly distributed, by which the container box can be clamped by the plurality of first clamping blocks more firmly.

It can be further configured in a preferable embodiment of the present application that the positioning ring is fixedly provided with a first reinforcement portion, and the first reinforcement portion is fixedly connected to the bottom box.

By adopting the above technical solution, the first reinforcement portion further increases the connection firmness between the positioning ring and the bottom box.

It can be further configured in a preferable embodiment of the present application that the outer sidewall of each of the plurality of first clamping blocks is configured with a first inclined plane, and the inner sidewall of each of the plurality of second clamping blocks is configured with a second inclined plane.

By adopting the above technical solution, the outer sidewall of the first clamping block is provided with the first inclined plane, and the inner sidewall of the second clamping block is provided with the second inclined plane, therefore, when the user covers the box cover on the bottom box, the contacting area between an end of the first clamping block and an end of the second clamping block can be reduced, such that the first clamping block will not interfere with the second clamping block.

It can be further configured in a preferable embodiment of the present application that an inner sidewall of each of the plurality of first clamping blocks is fixedly provided with a plurality of plastically deformable components.

By adopting the above technical solution, the plurality of plastically deformable components further enhance the structural strength of the first clamping block, thereby elongating the service life of the first clamping block. When the container box is placed between the plurality of first clamping blocks, the container box squeezes the plurality of plastically deformable components at the same time, so that the plurality of plastically deformable components are deformed, which increases the friction between the plurality of plastically deformable components and the container box, thereby ensuring that the container box will not be detached from the plurality of first clamping blocks, and increasing the firmness of clamping the container box by the plurality of first clamping blocks.

It can be further configured in a preferable embodiment of the present application that a first end of each of the plurality of plastically deformable components is fixedly connected with the bottom box, and a second end of each of the plurality of plastically deformable components is configured with a chamfer.

By adopting the above technical solution, the first end of the plastically deformable component is fixedly connected with the bottom box, which further enhances the connection strength between the plastically deformable component and the bottom box. When the container box is placed between the plurality of first clamping blocks, the contacting area between the second end of the plastically deformable component and the outer sidewall of the container box can be reduced because of the chamfer at the second end of the plastically deformable component, which facilitates placing the container box between the plurality of first clamping blocks, and by which the container box can be protected.

It can be further configured in a preferable embodiment of the present application that a second rounded corner is provided on a side of each of the plurality of plastically deformable components departing from the plurality of first clamping blocks.

By adopting the above technical solution, when the container box is placed between the plurality of first clamping blocks, the second rounded corner can increase the contacting area between the plastically deformable component and the container box, thereby reducing the pressure of the plastically deformable component on the container box, which protects the container box, and elongates the service life of the container box.

In summary, at least one of the following beneficial technical effects is realized:

1. The mounting component is provided, and the mounting component is detachably fastened in the mounting hole in the center of the box cover, such that the part in the center of the box cover can be disassembled. The bottom box, the box base and the box cover are of an integrated structure, such that the bottom box, the box base and the box cover can be separately recycled as single materials at the same time after the mounting component is disassembled.
2. The first folding section and the second folding section are provided, such that the box base can be rotationally connected to the bottom box via the first folding section and the box cover can be rotationally connected to the box base. The first folding section and the second folding section are located at opposite sides of the box base, respectively, such that centers of the bottom box, the box base and the box cover are located on the same straight line when they are unfolded, thereby improving the impression of the powder box.
3. After the box base is sleeved in the bottom box via the first folding section, the box cover drives the cover plate to position in the first groove through the rotation of the second folding section. Further, the second snapping groove is engaged with the first folding section after being folded, so that the rotation of the box cover can be limited, and the cover plate can cover the first folding section, thereby improving the impression of the powder box.

DETAILED DESCRIPTION

The present application will be further described in detail below in combination with the FIGS. 1-12.

The terms used in the present application are only aimed to describe specific embodiments, not to limit the present application. Unless otherwise defined, technical terms or scientific terms used in the present application should be understood as ordinary meaning for those skilled in the related art. "First", "second" and similar terms used in the present application do not represent any sequence, quantity or significance, which are only used for distinguishing different components. In addition, the term of "and/or" in the present application only describes an association relationship of association objects, representing that three relationships exist, for example, A and/or B can represent three relationships: only A exists, A and B exist simultaneously, and only B exists. In particular, a character of "/" in the present application generally represents a "or" relationship between the former and latter objects without otherwise specified.

A cosmetics powder box is used for containing powder material for facial in daily life. The powder material has many forms such as foundation, BB cream or the like. Most of powder materials are only matched with one powder box, and if the user wants to use a powder material again after using it up, it is difficult to supplement the same powder material unless purchasing the same powder box. In particular, mirrors in most cosmetics powder box on the market are difficult to be disassembled. The cosmetics powder boxes are difficult to be disassembled to separate component made of a single material further to be recycled after the powder material is used up, and they have to be discarded, which is unfavorable for recycling.

In order to solve the above problems, a cosmetic powder box for ease of disassembling to recycle is disclosed.

Figure 1:
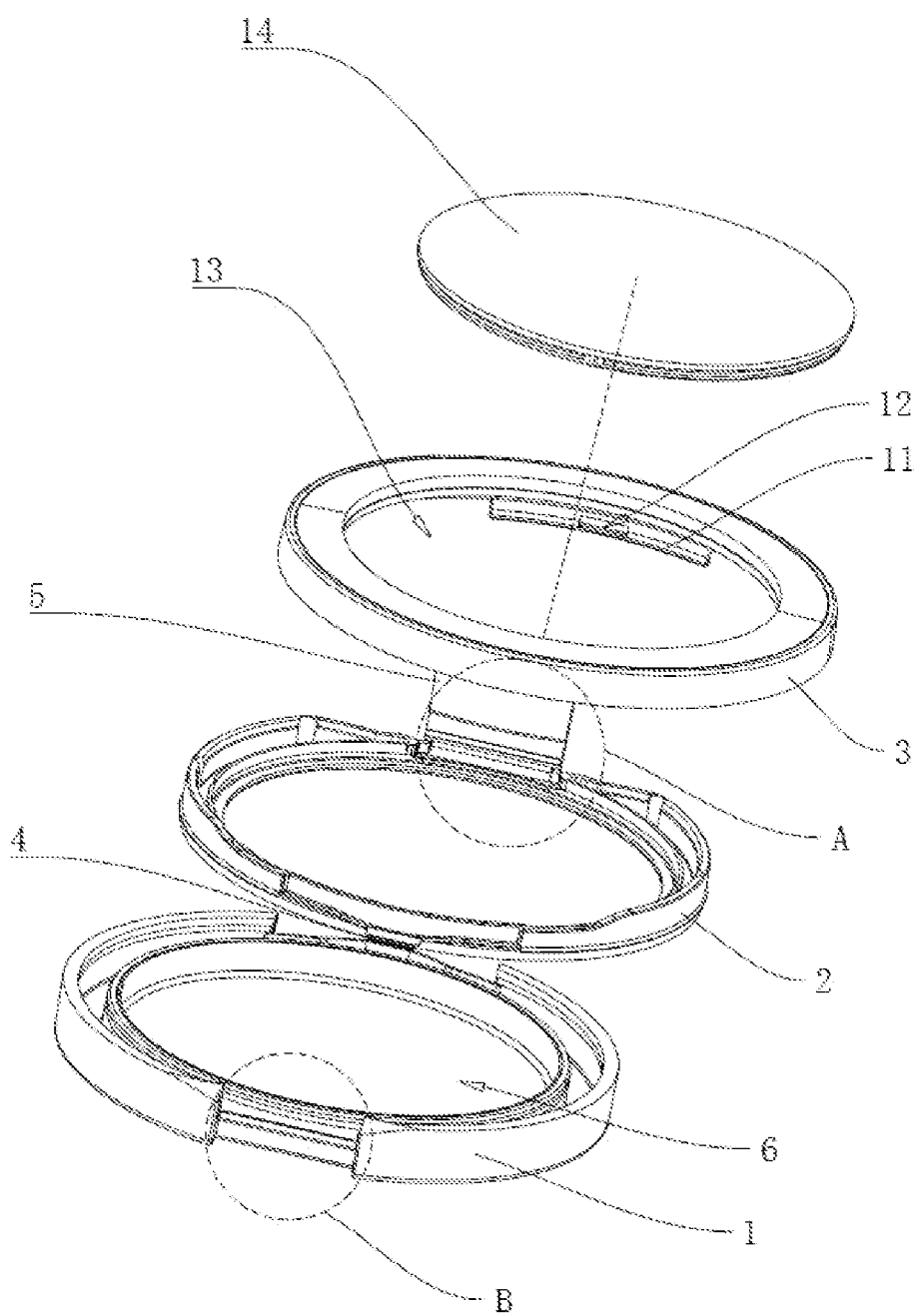
FIG. 1 is a diagram of a bottom box, a box base and a box cover of an unfolded cosmetic powder box according to an embodiment of the present application.

Referring to FIG. 1, the cosmetics powder box includes a bottom box 1, a box base 2 and a box cover 3. One side of the box base 2 is rotationally connected to the bottom box 1, and one side of the box cover 3 is rotationally connected to the box base 2. Specifically, a first folding section 4 is integrally fixed between the bottom box 1 and the box base 2. The box base 2 is rotationally connected to the bottom box 1 by fold of the first folding section 4. A second folding section 5 is integrally fixed between the box base 2 and the box cover 3. The box cover 3 is rotationally connected to the box base 2 by fold of the second folding section 5. The first folding section 4 and the second folding section 5 are located at opposite sides of the box base 2, respectively, such that when unfolding the bottom box 1, the box base 2 and the box cover 3, their centers are located on the same straight line, thereby improving the impression of the powder box.

Figure 2:
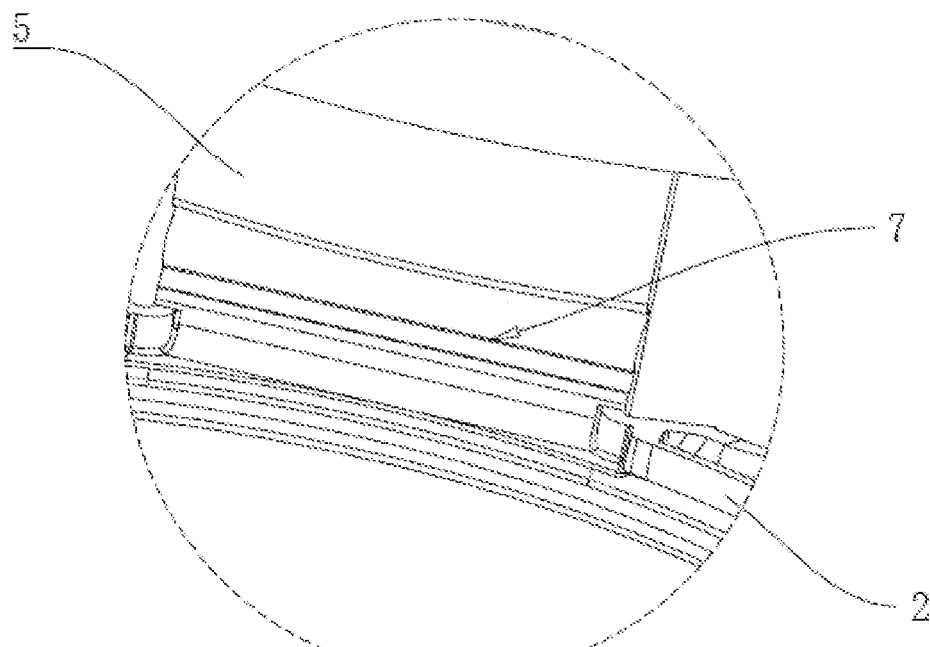
FIG. 2 is an enlarged schematic view of portion A and portion B in FIG. 1.
Figure 2:
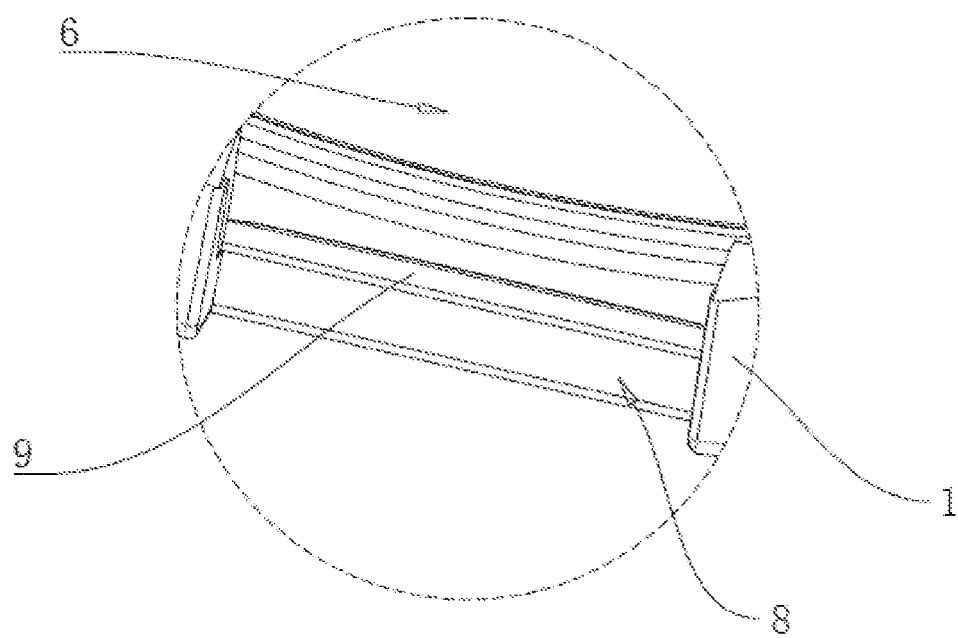
Figure 3:
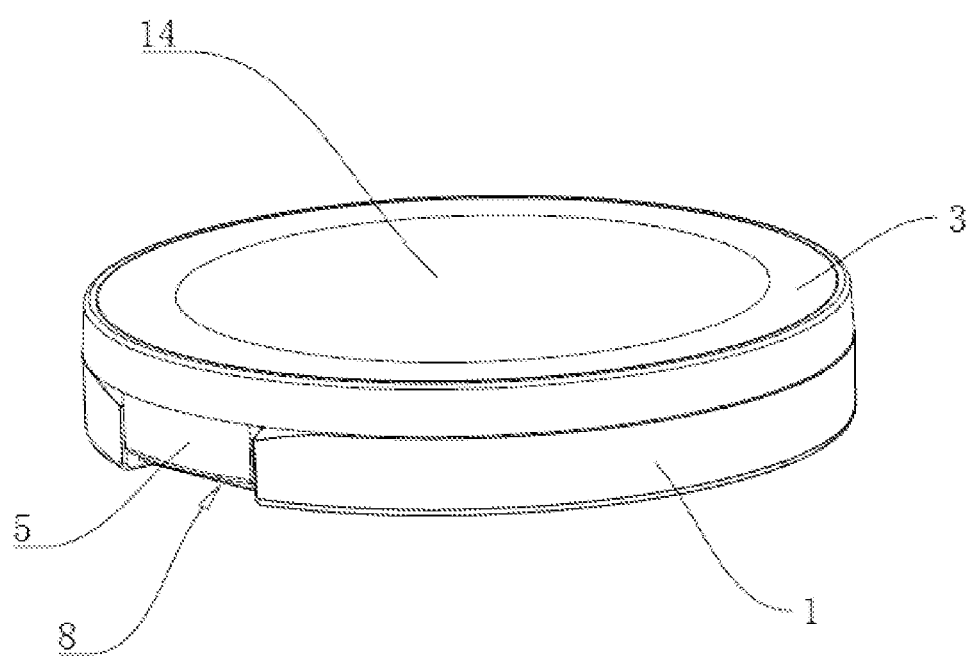
FIG. 3 is an overall structure diagram of a cosmetic powder box according to an embodiment of the present application.

Referring to FIGS. 1-2, a container box 6 for containing powder material is provided in the bottom box 1, and the box base 2 can be sleeved in the bottom box 1 by fold of the first folding section 4 for rotation. Specifically, a slot 7 is defined at a section of the second folding section 5 facing the box base 2, a second groove 8 is defined at a side of the bottom box 1 opposite to the first folding section 4, and a size of the second groove 8 is matched with a size of the second folding section 5 after being folded. An inner bottom wall of the second groove 8 is integrally fixed with an inserting block 9 for inserting in the slot 7. When the box base 2 rotates by fold of the first folding section 4 to drive the second folding section 5 to rotate into the second groove 8, the inserting block 9 in the second groove 8 is inserted into the slot 7 of the second folding section 5, so that the inserting block 9 in the second groove 8 is inserted in the slot 7 of the second folding section 5, by which the rotation of the second folding section 5 can be limited, and in turn the box base 2 is sleeved in the bottom box 1 and abuts against the powder material contained in the container box 6, thereby having an effect of limiting the movement of the powder material for ease of usage. Referring to FIG. 3, when the second folding section 5 is located in the second groove 8 and the box cover 3 is inserted into the bottom box 1, the second folding section 5 after being folded can be hidden in the second groove 8 because the size of the second groove 8 is matched with the size of the second folding section 5 after being folded, thereby improving the impression of the powder box.

Figure 4:
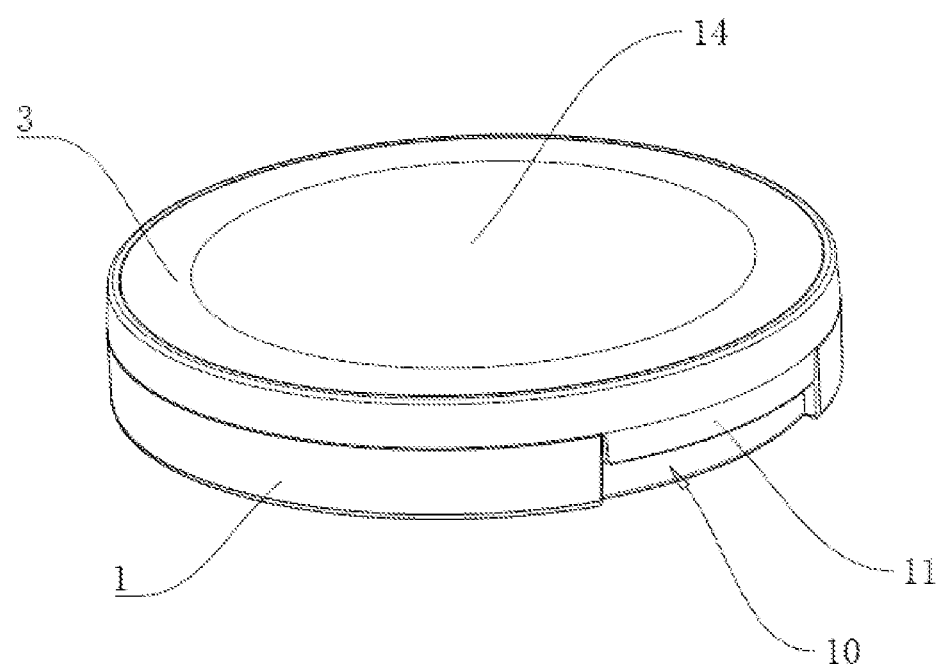
FIG. 4 is another overall structure diagram of a cosmetic powder box according to an embodiment of the present application.

Referring to FIGS. 1 and 4, a first groove 10 is defined at a side of the bottom box 1 facing the box base 2, and the first folding section 4 is integrally fixed to an inner bottom wall of the first groove 10. A side of the box cover 3 opposite to the second folding section 5 is integrally fixed with a cover plate 11 for covering the first folding section 4. A second snapping groove 12 is defined at a side of the cover plate 11 facing the box cover 3, and the second snapping groove 12 is configured to be engaged with the first folding section 4 after being folded. A folding end of the first folding section 4 is rounded, so that it is easy for the user to engage the first folding section 4 after being folded with the second snapping groove 12. After the box base 2 is sleeved in the bottom box 1 via the first folding section 4, the box cover 3 drives the cover plate 11 to rotate by the second folding section 5, such that the cover plate is positioned in the first groove 10. Further, the second snapping groove 12 is engaged with the first folding section 4 after being folded, so that the rotation of the box cover 3 can be limited, the cover plate 11 can cover the first folding section 4, thereby improving the impression of the powder box.

Referring to FIG. 1, a mounting hole 13 is defined in the center of the box cover 3, and a mounting component 14 is detachably fastened in the mounting hole 13, so that a part in the center of the box cover 3 can be detached. The mounting component 14 can be a mounting base with a plane mirror 15, or a mounting ring with a transparent decorative sheet 16. The mounting component 14 can be customized and replaced in accordance with user's functional requirements, and also can be processed in accordance with use demand, for example, drawing patterns, adding colors or other process for improving the impression of the powder box. The bottom box 1, the box base 2 and the box cover 3 are made of a single material, respectively, and they are made in one piece. After the cosmetic powder containing in the container box 6 is used up, the users can detach the mounting component 14, so that the mounting component 14, the bottom box 1, the box base 2 and the box cover 3 can be recycled separately as single materials, thereby facilitating detaching the mounting component 14 by the user for personal use, and enhancing environmental awareness of the users.

Figure 5:
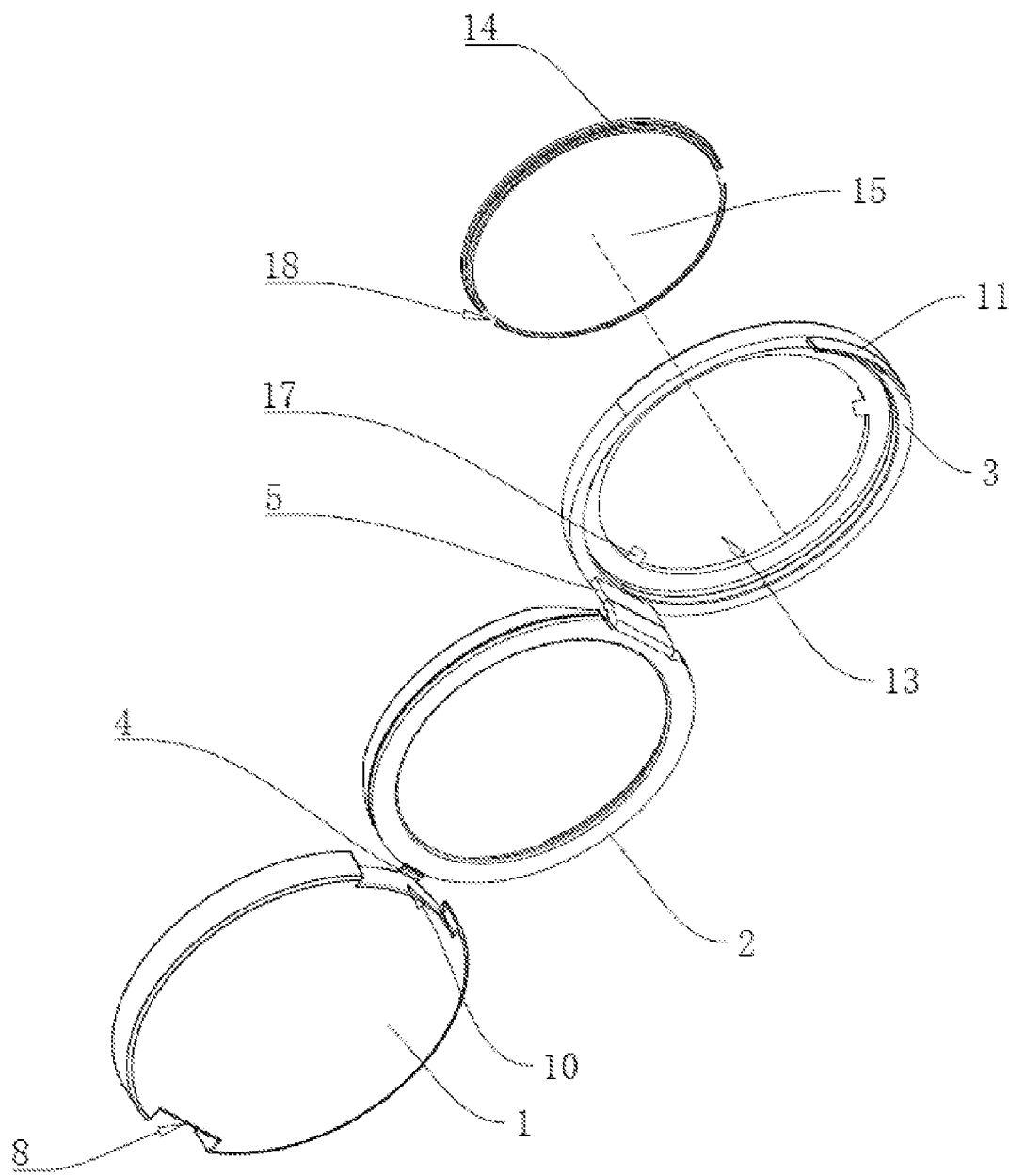
FIG. 5 is a diagram of a bottom box, a box base and a box cover of an unfolded cosmetic powder box according to Embodiment 1 of the present application.

Referring to FIG. 5, in an optional embodiment, the mounting component 14 is a mounting base, which is configured with a mounting slot for mounting the plane mirror 15, thereby facilitating the user to mount the mirror to wear make-up. An inner sidewall of the mounting hole 13 is integrally fixed with a first snap block 17, a size of the mounting base is matched with a size of the mounting hole 13, therefore, the mounting base can cover the mounting hole 13 when it is located in the mounting hole 13, thereby improving the impression of the powder box. A first snapping groove 18 configured to be engaged with the first snap block 17 is defined at an outer sidewall of the mounting base. The first snap block 17 is engaged with the first snapping groove 18, such that the mounting base with mirror can be detachably fastened in the mounting hole 13 in the center of the box cover 3. When the cosmetic powder box must be disassembled after the cosmetic power is used up, a force can be applied on the mounting base to detach the first snap block 17 from the first snapping groove 18, such that the mounting base is detached from the mounting hole 13, so as to detach the powder box from the mounting base, thereby recycling single materials separately.

Figure 6:
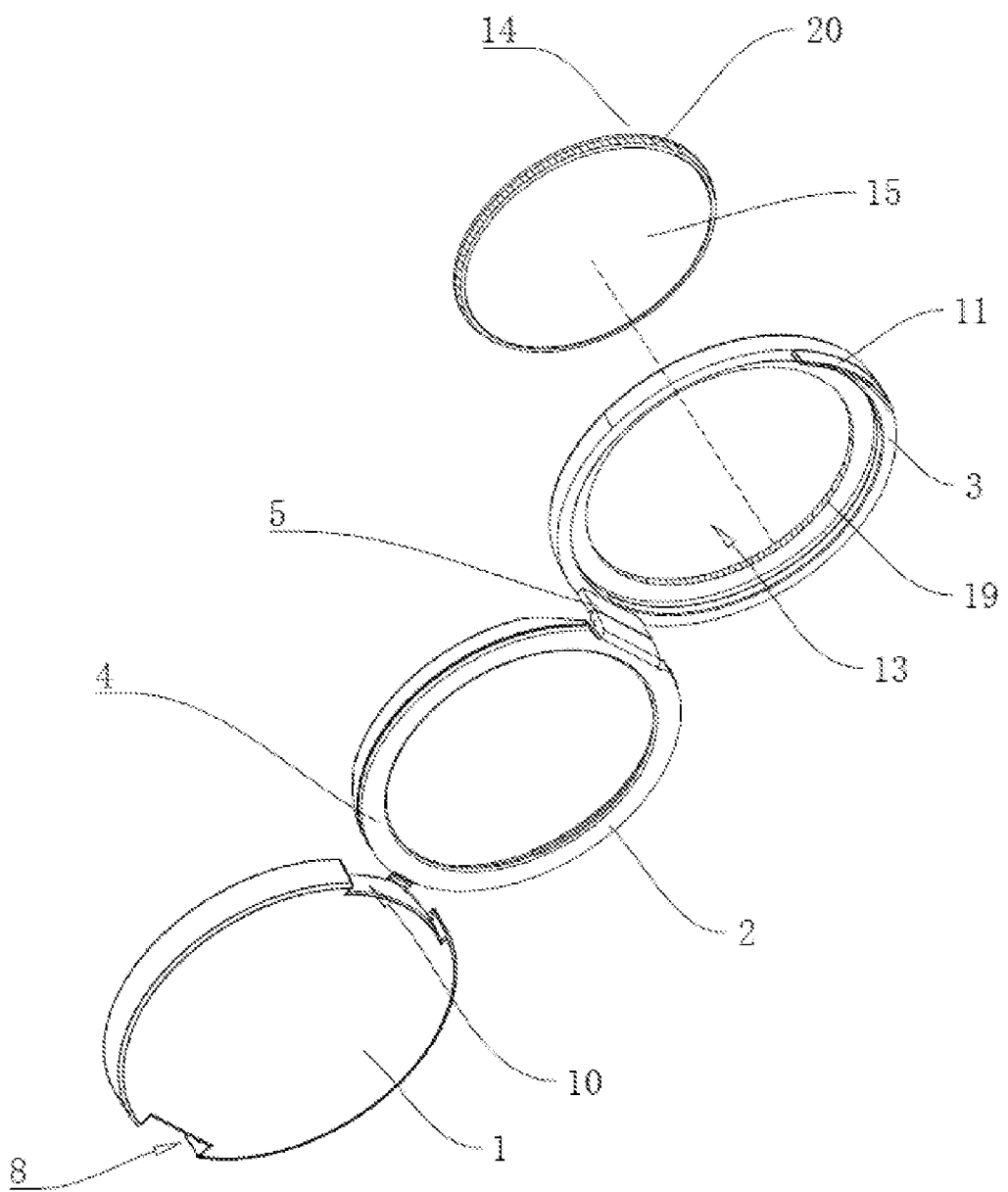
FIG. 6 is a diagram of a bottom box, a box base and a box cover of an unfolded cosmetic powder box according to Embodiment 2 of the present application.

Referring to FIG. 6, in another optional embodiment, the mounting component 14 is a mounting base, which is configured with a mounting slot for mounting the plane mirror 15. An inner sidewall of the mounting hole 13 is fixedly connected with a magnetic sheet 19 along its whole circumference. The size of the mounting base is matched with the size of the mounting hole 13, and the mounting base is provided with a magnetic strip 20 attracting the magnetic sheet 19 along the whole circumference of the mounting base. When the mounting base is located in the mounting hole 13, the mounting base with mirror can be detachably fastened in the mounting hole 13 in the center of the box cover 3 because of the attraction between the magnetic sheet 19 and the magnetic strip 20. When the cosmetic powder box must be disassembled after the cosmetic powder is used up, a force is applied on the mounting base to detach the magnetic strip 20 from the magnetic attraction, such that the mounting base is detached from the mounting hole 13, so as to detach the powder box from the mounting base, thereby recycling single materials separately.

Figure 7:
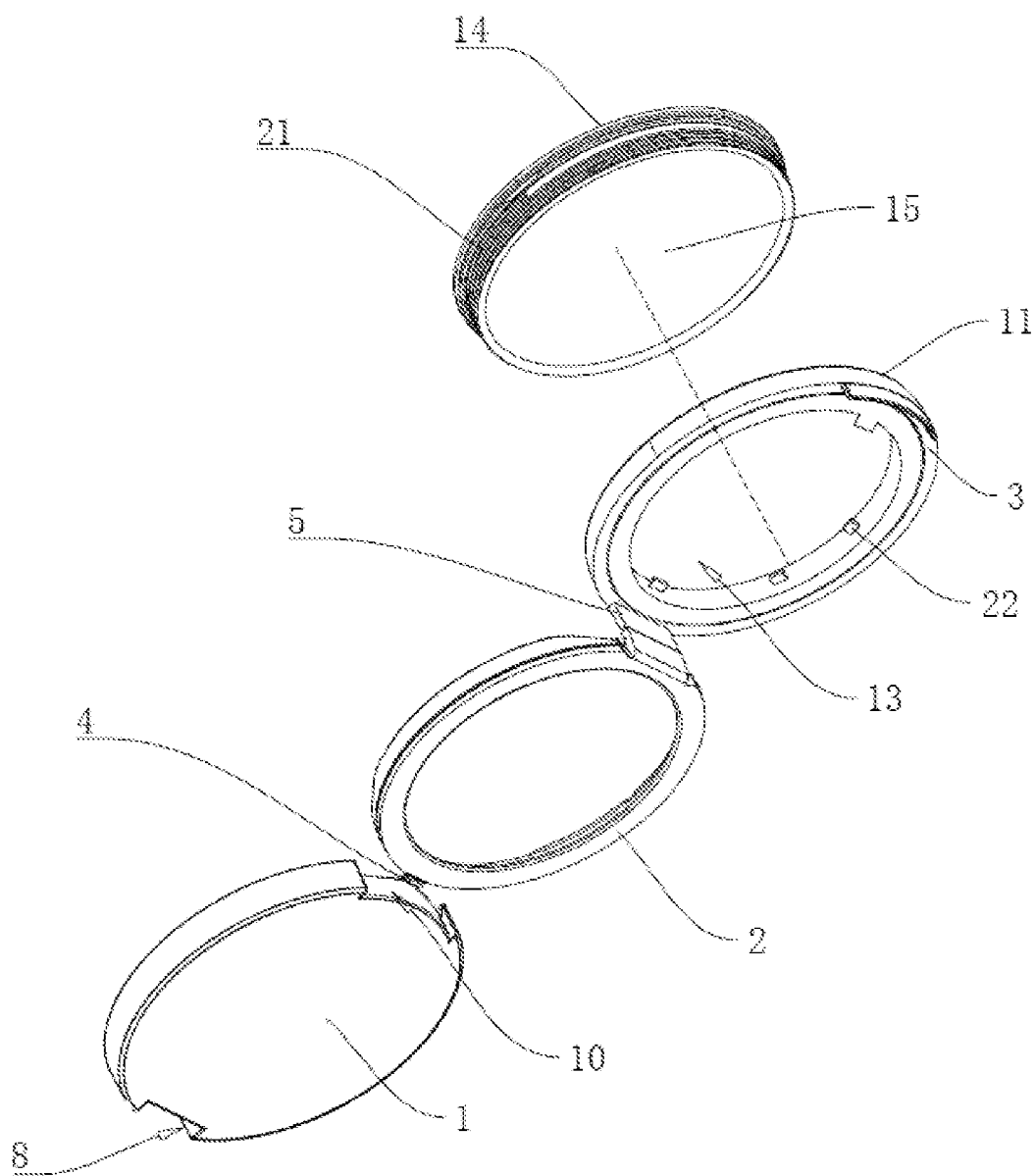
FIG. 7 is a diagram of a bottom box, a box base and a box cover of an unfolded cosmetic powder box according to Embodiment 3 of the present application.

Referring to FIG. 7, in the other optional embodiment, the mounting component 14 is a mounting base, which is configured with a mounting slot for mounting the plane mirror 15. An outer sidewall of the mounting base is integrally fixed with an external thread 21, an inner sidewall of the mounting hole 13 is obliquely provided with a plurality of flanges 22 at positions corresponding to a thread path of the external thread 21, and the external thread 21 is screwed to the plurality of flanges 22. The mounting component 14 with mirror is detachably fastened in the mounting hole 13 because of the threaded connection between the plurality of flanges 22 of the mounting component 14 and the external thread 21 of the mounting hole 13. When the cosmetic powder box must be disassembled after the cosmetic powder is used up, the mounting component 14 can be rotated, such that the mounting component is detached from the mounting hole 13, so as to detach the powder box from the mounting component 14, thereby recycling single materials separately.

Figure 8:
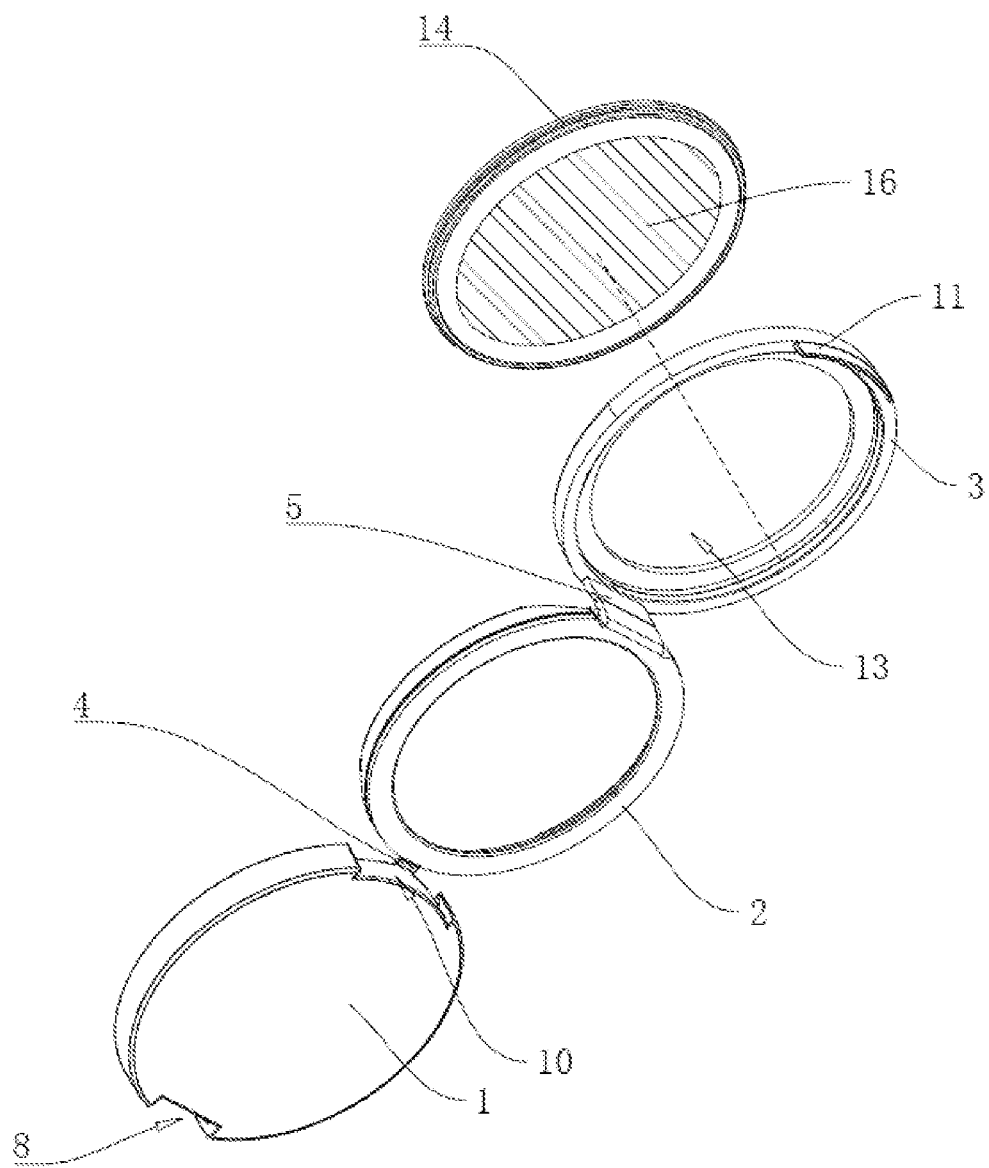
FIG. 8 is a diagram of a bottom box, a box base and a box cover of an unfolded cosmetic powder box according to Embodiment 4 of the present application.

Referring to FIG. 8, in an embodiment, the mounting component 14 is a mounting ring. An inner sidewall of the mounting ring is fixedly provided with a transparent decorative sheet 16, which facilitates observing inside of the bottom box 1 when the mounting component 14 is mounted in the mounting hole 13. The transparent decorative sheet 16 can be designed with different transparent colors in accordance with design requirements, thereby improving the impression of the powder box. The transparent decorative sheet 16 can further be drawn with symbols such as characters, patterns or the like, thereby facilitating identifying brand of the powder box by users. The mounting ring can be disassembled after the cosmetic powder is used up, so that the powder box is detached from the mounting component 14, thereby recycling single materials separately.

Figure 9:
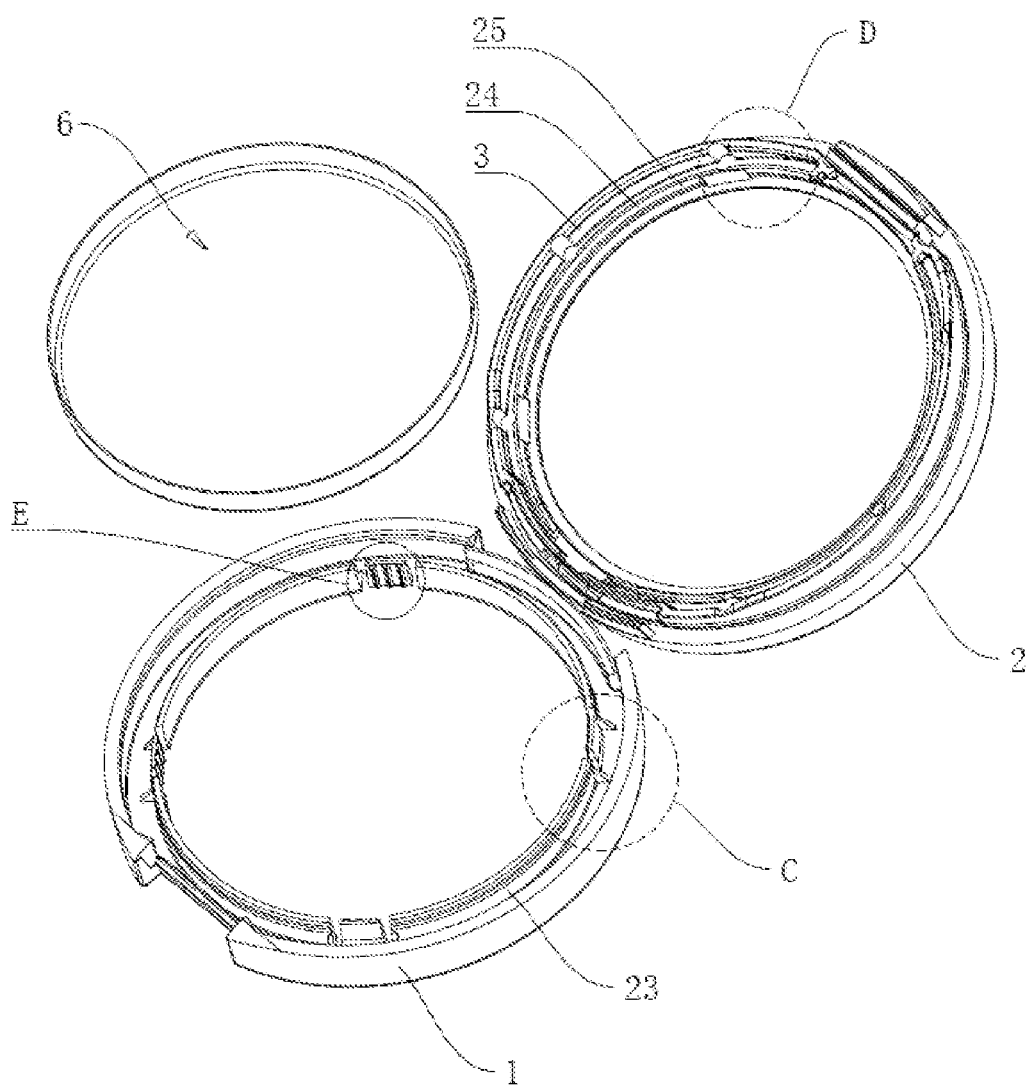
FIG. 9 is a diagram of the unfolded bottom box, box base, box cover and container box in another state of the present application.

Referring to FIG. 9, the bottom box 1 is integrally formed with a positioning ring 23, and a center axis of the positioning ring 23 coincides with that of the bottom box 1. The box cover 3 is integrally formed with at least one arc-shaped block 24, in this embodiment with two arc-shaped blocks 24. When the box cover 3 is covered on the bottom box 1, inner sidewalls of the two arc-shaped blocks 24 abut against the outer sidewall of the positioning ring 23. When the box cover 3 is covered on the bottom box 1, the inner sidewalls of the arc-shaped blocks 24 abut against the outer sidewall of the positioning ring 23, therefore the positioning ring 23 has a positioning effect on the arc-shaped blocks 24 and in turn on the box cover 3, thereby ensuring that the box cover 3 will not deviate.

Figure 10:
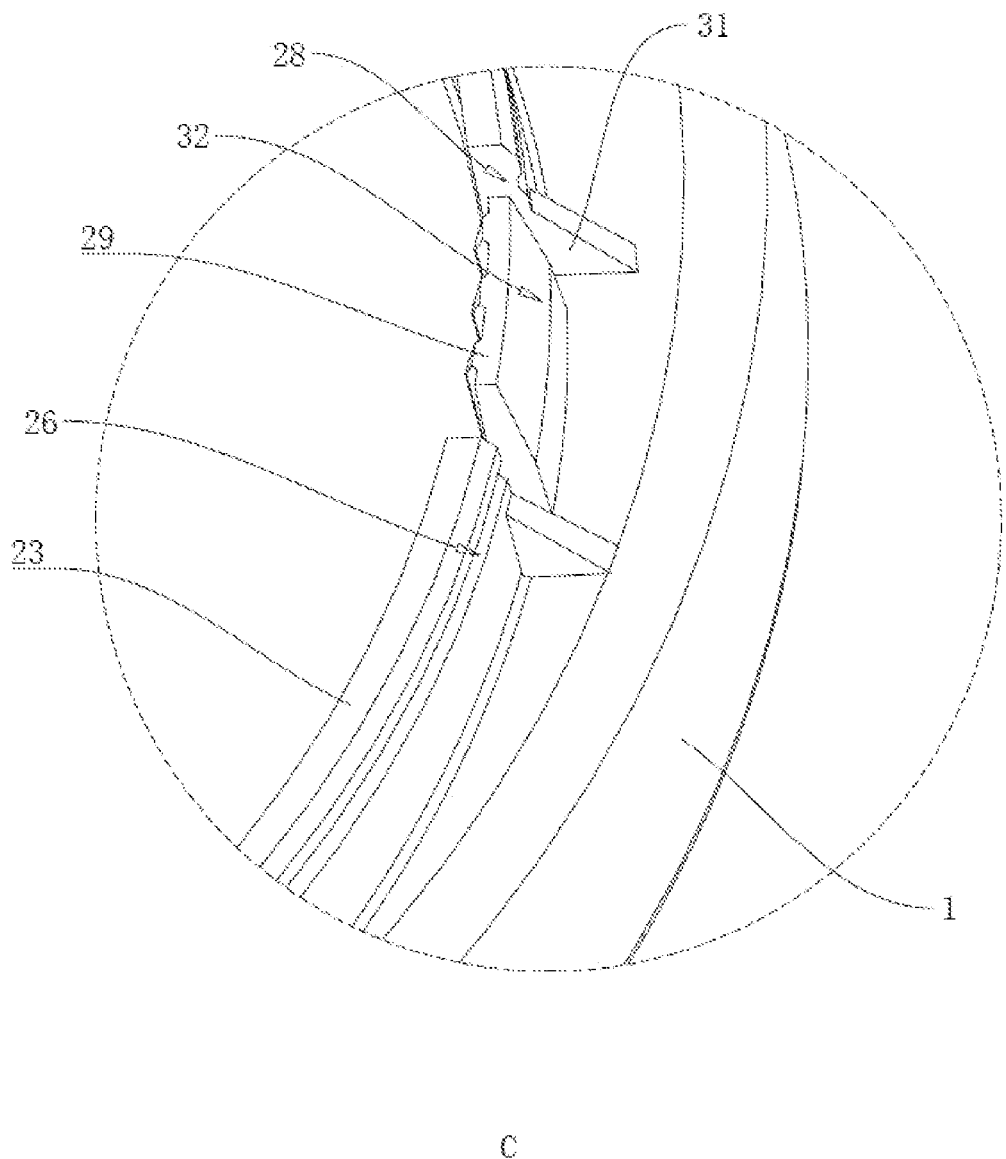
FIG. 10 is an enlarged schematic view of portion C in FIG. 9.

Referring to FIGS. 9-10, the inner sidewall of the arc-shaped block 24 is fixedly provided with an arc-shaped protrusion 25, and the outer sidewall of the positioning ring 23 is configured with an arc-shaped groove 26. When the box cover 3 is covered on the bottom box 1, an outer sidewall of the arc-shaped protrusion 25 abuts against the inner sidewall of the arc-shaped groove 26. Further, when the box cover 3 is covered the bottom box 1, the outer sidewall of the arc-shaped protrusion 25 abuts against the inner sidewall of the arc-shaped groove 26, such that the box cover 3 can be covered on the bottom box 1 more firmly.

Figure 11:
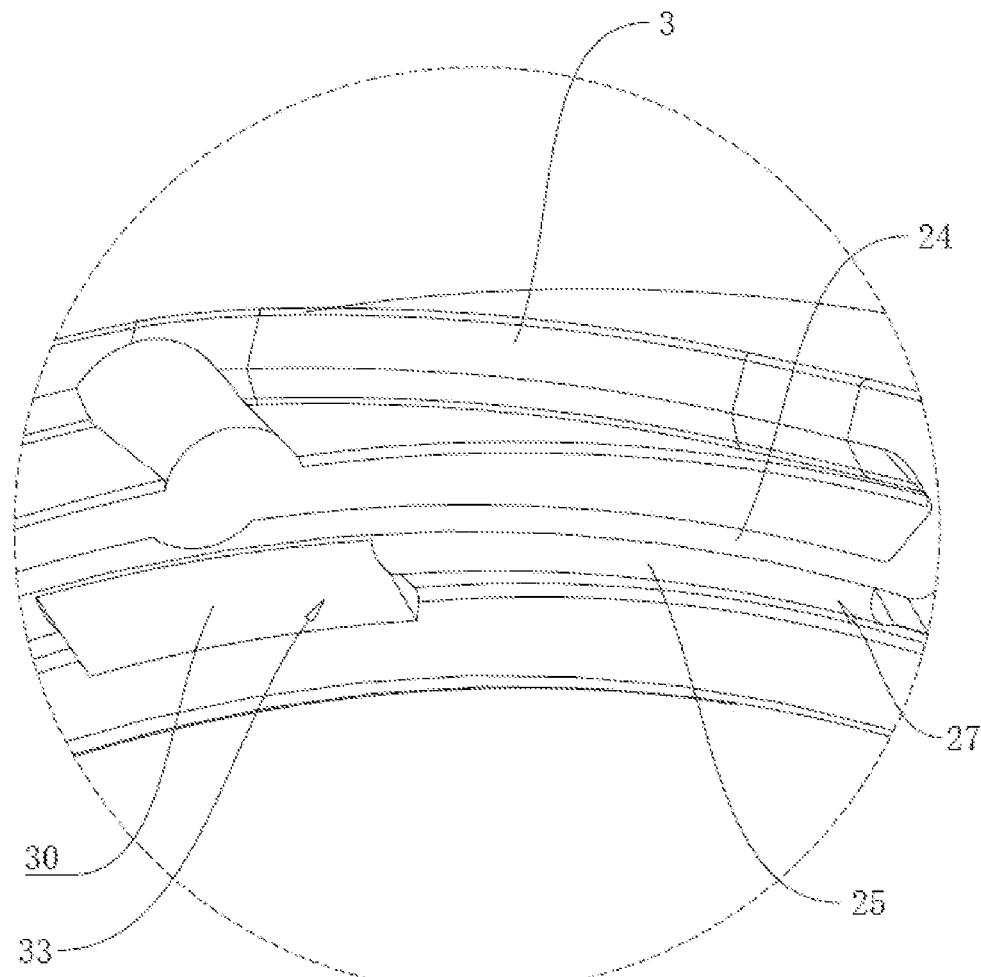
FIG. 11 is an enlarged schematic view of portion D in FIG. 9.

Referring to FIGS. 9 and 11, the arc-shaped protrusion 25 is provided with a first rounded corner 27. On the one hand, the first rounded corner 27 can increase the whole aesthetics of the arc-shaped protrusion 25; on the other hand, when opening and covering the box cover 3, the first rounded corner 27 can increase a contacting area between the arc-shaped protrusion 25 and the positioning ring 23, thereby reducing the pressure of the arc-shaped protrusion 25 on the positioning ring 23, such that the positioning ring 23 can be protected.

Referring to FIGS. 9-10, a plurality of evenly distributed relief grooves 28 are defined in the positioning ring 23. Referring to FIGS. 9 and 11, a groove bottom of each relief groove 28 is integrally formed with a first clamping blocks 29, wherein the container box 6 is located between a plurality of first clamping blocks 29. The inner sidewall of the arc-shaped block 24 is integrally formed with a plurality of second clamping blocks 30 corresponding to the first clamping blocks 29 one by one. When the box cover 3 is covered on the bottom box 1, the outer sidewall of the first clamping block 29 abuts against the inner sidewall of the second clamping block 30. The first clamping blocks 29 on the bottom box 1 have the same quantity as the second clamping blocks 30 on the box cover 3, and when the box cover 3 is covered on the bottom box 1, the outer sidewall of the first clamping block 29 abuts against the inner sidewall of the second clamping block 30, therefore, the second clamping block 30 can squeeze the first clamping block 29, such that the plurality of first clamping blocks 29 are elastically deformed in a direction towards the container box 6, and the plurality of first clamping blocks 29 have a clamping effect on the container box 6, thereby increasing the firmness of the container box 6 on the bottom box 1. The plurality of first clamping blocks 29 are evenly distributed, therefore, the container box 6 can be clamped by the plurality of first clamping blocks 29 more firmly.

Referring to FIGS. 10-11, the outer sidewall of the first clamping block 29 is provided with a first inclined plane 32, and the inner sidewall of the second clamping block 30 is provided with a second inclined plane 33. When the user covers the box cover 3 on the bottom box 1, the contacting area between an end of the first clamping block 29 and an end of the second clamping block 30 can be reduced, thereby ensuring that the first clamping block 29 will not interfere with the second clamping block 30.

Referring to FIG. 10, the positioning ring 23 is integrally formed with a plurality of first reinforcement portions 31, the plurality of first reinforcement portions 31 and the bottom box 1 are integrally formed, the plurality of first reinforcement portions 31 further increase the connection firmness between the positioning ring 23 and the bottom box 1.

Figure 12:
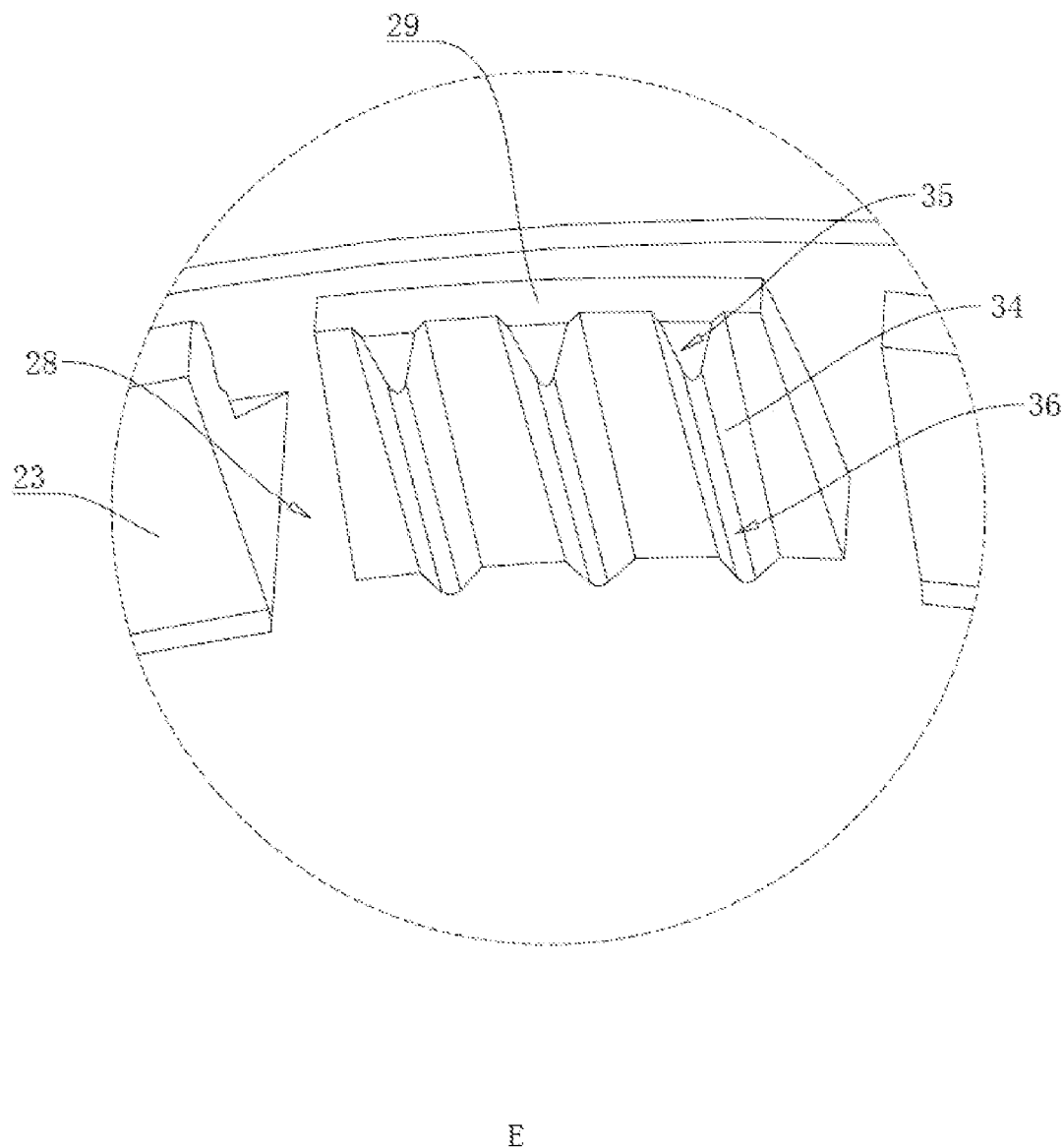
FIG. 12 is an enlarged schematic view of portion E in FIG. 9.

Referring to FIGS. 9 and 12, the inner sidewall of the first clamping block 29 is integrally formed with a plurality of plastically deformable components 34. The plurality of plastically deformable components 34 further enhance the structural strength of the first clamping block 29, thereby elongating the service life of the first clamping block 29.

Referring to FIG. 12, the first end of the plastically deformable component 34 is integrally formed with the bottom box 1, while the second end of the plastically deformable component 34 is provided with a chamfer 35. The first end of the plastically deformable component 34 and the bottom box 1 are integrated formed, which further enhances the connection strength between the plastically deformable component 34 and the bottom box 1. When the container box 6 is placed between the plurality of first clamping blocks 29, the chamfer 35 at the second end of the plastically deformable component 34 can reduce the contacting area between the second end of the plastically deformable component 34 and the outer sidewall of the container box 6, which is convenient to place the container box 6 between the plurality of first clamping blocks 29, and by which the container box 6 can be protected.

Referring to FIGS. 9 and 12, a second rounded corner 36 is provided on a side of the plastically deformable component 34 departing from the first clamping block 29. When the container box 6 is placed between the plurality of first clamping blocks 29, the second rounded corner 36 can increase the contacting area between the plastically deformable component 34 and the container box 6, thereby reducing the pressure of the plastically deformable component 34 on the container box 6, by which the container box 6 can be protected, thereby elongating the service life of the container box 6.

An implementation principle of the embodiment of the present application is as follows. The mounting component 14 is provided and the mounting component 14 is detachably fastened in the mounting hole 13 in the center of the box cover 3, such that the part in the center of the box cover 3 can be disassembled. The bottom box 1, the box base 2 and the box cover 3 are integrally formed, such that the bottom box 1, the box base 2 and the box cover 3 can be recycled separately as single materials at the same time after the mounting component 14 is disassembled.

The above specific embodiments do not tend to limit the protection scope of the present application. Those skilled in the art should understand that, various modifications, combinations, sub combinations, and substitutions can be made in accordance with design requirements and other factors. Any modifications, equivalent replacements and improvements made within the spirit and principles of the present application should be covered within the protection scope of the present application.

REFERENCE SIGN LIST 1 bottom box
2 box base
3 box cover
4 first folding section
5 second folding section
6 container box
7 slot
8 second groove
9 inserting block
10 first groove
11 cover plate
12 second snapping groove
13 mounting hole
14 mounting component
15 plane mirror
16 transparent decorative sheet
17 first snap block
18 first snapping groove
19 magnetic sheet
20 magnetic strip
21 external thread
22 flange
23 positioning ring
24 arc-shaped block
25 arc-shaped protrusion
26 arc-shaped groove
27 first rounded corner
28 relief groove
29 first clamping block
30 second clamping block
31 first reinforcement portion
32 first inclined plane
33 second inclined plane
34 plastically deformable component
35 chamfer
36 second rounded corner

What is claimed is:

1. A cosmetic powder box, comprising:
a bottom box;
a box base, one side of the box base is rotationally connected to the bottom box, and the box base is sleeved in the bottom box through rotating around the bottom box;
a box cover, one side of the box cover is rotationally connected to the box base, when the box base is sleeved in the bottom box, the box cover rotates around the bottom box, such that the box cover is buckled with the bottom box, and a mounting hole is defined in a center of the box cover; and
a mounting component detachably fastened in the mounting hole,
wherein the bottom box, the box base and the box cover are an integrated structure, the bottom box is fixedly provided with a positioning ring, the box cover is fixedly provided with at least one arc-shaped block, when the bottom box is covered with the box cover, an inner sidewall of the at least one arc-shaped block abuts against an outer sidewall of the positioning ring, a plurality of relief grooves are defined in the positioning ring, a groove bottom of each of the plurality of relief grooves is fixedly provided with a first clamping block, a container box for powder material is provided between the plurality of first clamping blocks, the inner sidewall of each of the at least one arc-shaped block is fixedly provided with a plurality of second clamping blocks corresponding to the plurality of first clamping blocks one by one, and when the bottom box is covered with the box cover, an outer sidewall of each of the plurality of first clamping blocks abuts against an inner sidewall of a respective one of the plurality of second clamping blocks.

2. The cosmetic powder box according to claim 1, wherein a mounting slot for mounting a plane mirror is defined at the mounting component, an inner sidewall of the mounting hole is provided with a first snap block, a size of the mounting component is matched with a size of the mounting hole, and a first snapping groove configured to be engaged with the first snap block is defined at an outer sidewall of the mounting component.

3. The cosmetic powder box according to claim 1, wherein a mounting slot for mounting a plane mirror is defined at the mounting component, an inner sidewall of the mounting hole is provided with a magnetic sheet along a whole circumference of the mounting hole, a size of the mounting component is matched with a size of the mounting hole, and the mounting component is provided with a magnetic strip configured to attract the magnetic sheet.

4. The cosmetic powder box according to claim 1, wherein a mounting slot for mounting a plane mirror is defined at the mounting component, an outer sidewall of the mounting component is provided with an external thread, an inner sidewall of the mounting hole is obliquely provided with a plurality of flanges at positions corresponding to a thread path of the external thread, and the external thread is screwed to the plurality of flanges.

5. The cosmetic powder box according to claim 1, wherein the mounting component is a mounting ring, and a transparent decorative sheet is arranged in the mounting ring.

6. The cosmetic powder box according to claim 1, wherein a first folding section is integrally fixed between the bottom box and the box base, and the box base is rotationally connected to the bottom box by fold of the first folding section;
a second folding section is integrally fixed between the box base and the box cover, and the box cover is rotationally connected to the box base by fold of the second folding section; and
the first folding section and the second folding section are located at opposite sides of the box base, respectively.

7. The cosmetic powder box according to claim 6, wherein a first groove is defined at a side of the bottom box, the first folding section is secured to an inner bottom wall of the first groove, a side of the box cover opposite to the second folding section is provided with a cover plate for covering the first folding section, a second snapping groove is defined at a side of the cover plate facing the box cover, and the second snapping groove is configured to be engaged with the first folding section after being folded.

8. The cosmetic powder box according to claim 6, wherein a slot is defined at a section of the second folding section facing the box base, a second groove is defined at a side of the bottom box opposite to the first folding section, a size of the second groove is matched with a size of the second folding section after being folded, and an inner bottom wall of the second groove is configured with an inserting block for inserting in the slot.

9. The cosmetic powder box according to claim 1, wherein the inner sidewall of each of the at least one arc-shaped block is fixedly provided with an arc-shaped protrusion, an arc-shaped groove is formed at the outer sidewall of the positioning ring, and when the bottom box is covered with the box cover, an outer sidewall of the arc-shaped protrusion abuts against an inner sidewall of the arc-shaped groove.

10. The cosmetic powder box according to claim 9, wherein the arc-shaped protrusion is provided with a first rounded corner.

11. The cosmetic powder box according to claim 1, wherein the plurality of relief grooves are evenly distributed.

12. The cosmetic powder box according to claim 1, wherein the positioning ring is fixedly provided with a first reinforcement portion, and the first reinforcement portion is fixedly connected to the bottom box.

13. The cosmetic powder box according to claim 1, wherein the outer sidewall of each of the plurality of first clamping blocks is configured with a first inclined plane, and the inner sidewall of each of the plurality of second clamping blocks is configured with a second inclined plane.

14. The cosmetic powder box according to claim 1, wherein an inner sidewall of each of the plurality of first clamping blocks is fixedly provided with a plurality of plastically deformable components.

15. The cosmetic powder box according to claim 14, wherein a first end of each of the plurality of plastically deformable components is fixedly connected with the bottom box, and a second end of each of the plurality of plastically deformable components is configured with a chamfer.

16. The cosmetic powder box according to claim 15, wherein a second rounded corner is provided on a side of each of the plurality of plastically deformable components departing from a respective one of the plurality of first clamping blocks.

* * * * *